United States Patent [19]
Bosch et al.

[11] Patent Number: 5,322,258
[45] Date of Patent: Jun. 21, 1994

[54] MICROMECHANICAL ACTUATOR

[75] Inventors: Dieter Bosch, München; Helmut Seidel, Starnbert; Gunter Mück, Holzkirchen, all of Fed. Rep. of Germany

[73] Assignee: Messerschmitt-Bölkow-Blohm GmbH, Fed. Rep. of Germany

[21] Appl. No.: 634,154

[22] PCT Filed: Apr. 19, 1990

[86] PCT No.: PCT/EP90/00634
§ 371 Date: Dec. 11, 1990
§ 102(e) Date: Dec. 11, 1990

[87] PCT Pub. No.: WO90/13750
PCT Pub. Date: Nov. 15, 1990

[30] Foreign Application Priority Data
Dec. 28, 1989 [DE] Fed. Rep. of Germany ....... 3914031

[51] Int. Cl.⁵ .............................................. F16K 31/08
[52] U.S. Cl. .................. 251/65; 251/129.01; 251/129.05; 251/331

[58] Field of Search ....................... 251/129.06, 65, 11, 251/129.01, 331, 129.05

[56] References Cited
U.S. PATENT DOCUMENTS
4,826,131  5/1989  Mikkor .
5,029,805  7/1991  Albarda et al. ................ 251/129.06

FOREIGN PATENT DOCUMENTS
8614741  11/1987  Fed. Rep. of Germany .
3621332   1/1988  Fed. Rep. of Germany .

*Primary Examiner*—Arnold Rosenthal
*Attorney, Agent, or Firm*—Evenson McKeown Edwards & Lenahan

[57] ABSTRACT

A micromechanical actuator is suggested, the movable part of which, such as the diaphragm, the bending bar or a similar device, can be moved relative to a stationary part by a combination of electromagnetic and electrostatic forces. The manufacturing techniques and the applications of the actuator are described. The construction is very compact, that is, highly integrated.

7 Claims, 7 Drawing Sheets

LORENTZ-FORCE: $\vec{F}_L = l(\vec{I} \times \vec{B})$

FORCE BETWEEN LIVE CONDUCTERS $$F_{12} = -\frac{\mu_0 \cdot l}{2\pi r} \cdot \vec{I}_1 \cdot \vec{I}_2$$

COULOMP-FORCE: $F_L = \dfrac{\varepsilon_0 \cdot A \cdot U^2}{2d^2}$

DIAPHRAGM WITH CURRENT CONDUCTORS

Si-PART 2
Si-PART 1

CURRENT CONDUCTORS
PERMANENT MAGNET
STRUCTURED SILICON
PERMANENT MAGNET

ELECTRODE
SILICON PART 2
SILICON PART 1

VALVE CONDITION : 0 : OPEN
: 1 : SHUT

MICROMECHANICAL ACTUATOR

BACKGROUND AND SUMMARY OF THE INVENTION

The invention relates to actuators made of microstructured substrates, with movable parts (such as bending bars or diaphragms) being driven by outside forces relative to a stationary part.

Micromechanical actuators have been employed, for example, as the ejecting elements of ink jet printers, light valves, light relays and the like, wherein the generation of driving forces is achieved electrostatically. This method can be implemented relatively easily and also offers the possibility of requiring only very low powers. On the other hand, it has the disadvantage that, because of the low driving power, the generated forces, particularly control and adjusting forces, are not very large. This is particularly disadvantageous when, for example, a fluid is to be set into motion or is to be stopped. The switching frequency of mechanical, electric or fluidically driven actuators is low.

It is an object of the present invention to provide a micromechanical actuator which, on the one hand, can be driven with a high switching frequency and, on the other hand, generates or emits reproducible finely apportioned actuating forces.

This object is achieved in a micromechanical actuator according to the invention having a stationary part and a movable part, such as a diaphragm, bending bar or rocker. The movable part can be switched to different positions by means of electromagnetic forces, and held in position by electrostatic forces.

The magnetic control of micromechanical actuators provided according to the invention offers multiple advantages in comparison to known processes. When permanent magnets are used, relatively large forces can be generated which, in contrast to electrostatic forces, are largely independent of the control distance of the movable part of the actuator. In addition, the forces can be generated in both directions and can be operated in the on/off switching mode as well as for switching from one position into another position. The actuators according to the invention may be operated with reasonably low electric voltages while nevertheless particularly high adjusting forces are generated magnetically. The actuator according to the invention may be manufactured relatively easily by means of known micromechanical methods, such as etching techniques or other types of microstructuring, as well as by means of manufacturing techniques for integrated circuits (IC's). An important advantage is the integrated construction of the actuator according to the invention, which includes the control and can be implemented in an extremely small space. This feature of the invention is particularly significant with respect to the combination of an electrostatic and magnetic generating of actuating forces, in the preferred embodiment disclosed hereinafter the latter being capable of being utilized for the deflection, bending-out or similar switchover from an inoperative position into an operative position, whereas the electrostatic force which can be applied almost without any power, is used for holding a movable part in the inoperative position.

The principal applications of the invention of microvalves for pneumatic and hydraulic uses for which the suggested actuator is very advantageous here as the result of its small dimensions and small mass. It is particularly easy to use not only for controlling a gas flow, but also for carrying out other actuating and switching functions. A use, for example, as a pneumatic analog/digital converter is advantageous because a binary switching condition on/off or open/shut can easily be reached. When several actuators are arranged in rows and columns (arrays) over a surface, a geometric assignment can easily by implemented, i.e., a surface-type detector or sensor application or an ultrasonic application or a sonar application and other vibrating applications. Light relays, light valves, diffraction grids, mechanical grids, filters, such as microfilters, opto-electronic, fluidic, mechano-electric line and array arrangements and applications are made possible by the invention because of its simple and effective construction in cases in which actuating and control functions must be carried out in a very small space also at a high frequency, including such actuating and control drives as are used in miniature pumps (diaphragm pumps) and miniature actuating motors (linear pushers). The actuator according to the invention m ay be used for the step-by-step as well as for the continuous actuating-force transmission, and may be used not only in the binary operation but also in a multistage manner continuously or discontinuously and for controlling a total flow or a partial flow of a electric current or of sound waves or light waves. It is suitable for working with or without back pressure, as well as with a vacuum.

Other objects, advantages and novel features of the present invention will become apparent from the following detailed description of the invention when considered in conjunction with the accompanying drawings.

BRIEF DESCRIPTION OF THE DRAWINGS

FIG. 3b is an enlarged view of a variation of the actuator mechanism of FIG. 3a;

DETAILED DESCRIPTION OF THE DRAWINGS

Figure 1A:
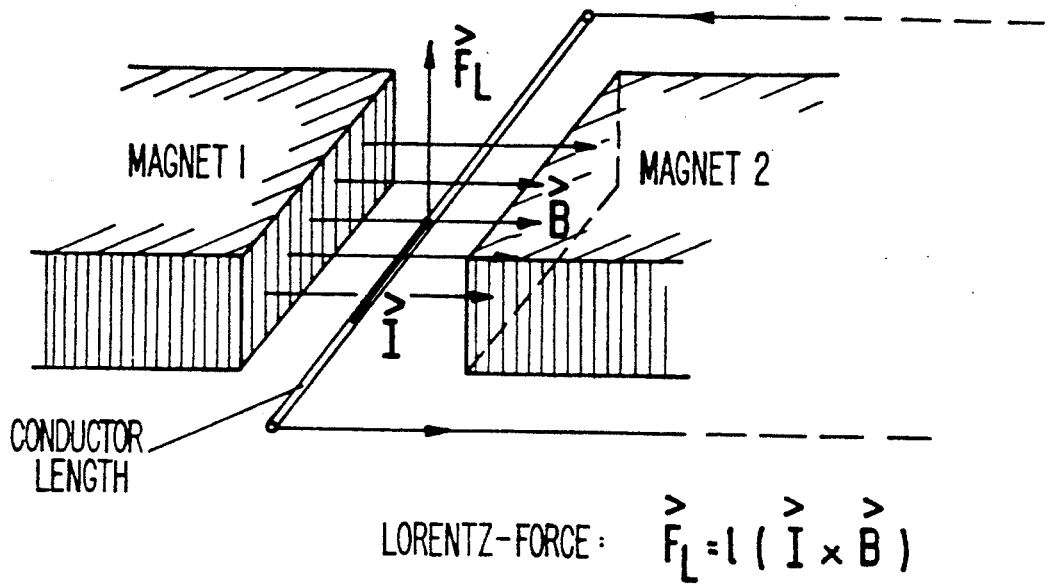
FIGS. 1a through c illustrate the types of electromechanical forces employed in the actuator according to the invention.
Figure 1B:
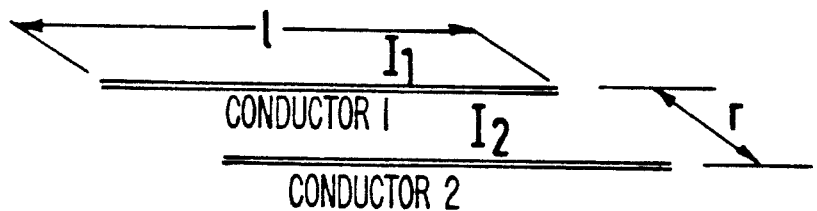
Figure 1C:
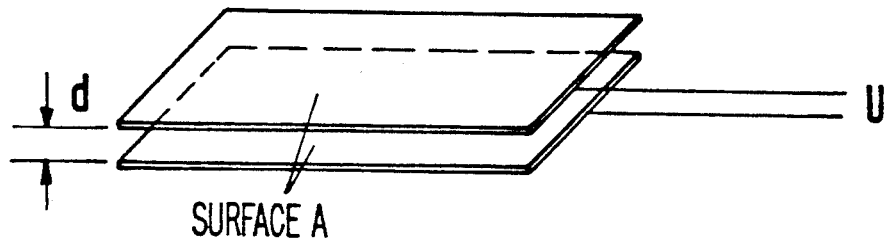

As illustrated in FIG. 1, for the implementation of micromechanical actuators, the present invention utilizes the following driving forces:

FIG. 1a—force on a live conductor in the magnetic field ("force 1");

FIG. 1b—force between two live conductors ("force 2");

FIG. 1c—force between electrically charged conducting surfaces ("force 3").

FIG. 2 illustrates four principal structural shapes of actuators made of structured silicon in accordance with the invention. They comprise bending bars and diaphragms as the movable elements, which are driven or held by means of forces 1 and 3. The "current conductors" indicated on the movable elements are in a cross-sectional view, and therefore extend perpendicularly with respect to the plane of projection. The magnetic field required for generating force 1, in all cases, is generated by permanent magnets. In principle, coil arrangements are also conceivable for this purpose, but will not be taken into account here for the following reasons:

Electric power is required for producing a field;

for geometrical and energy-related reasons, only relatively small fields can be produced;

the manufacturing of coils is expensive.

The integration of the permanent magnets in the actuators shown in FIG. 2 may take place in two different manners:

Finished permanent magnets of the desired shape and with a preferred magnetizing direction are connected directly with the silicon part of the actuator by means of adhesive agents, which are known per se. The adjusting aids required in this case in the form of mechanical positioning boundaries are worked into the silicon structure.

the production of the permanent magnets is included in the actuator technology sequence: the pulverized magnet material is pressed into the required shape in corresponding "tubs" of the silicon body, is sintered, thermally aftertreated and magnetized.

Cobalt samarium and neodymium-iron-boron are preferably used as permanent-magnet materials. These materials are characterized by a very high energy product maximum. Therefore, magnets of a high field intensity can be attained in very small dimensions which can be integrated with the silicon structure.

Figure 2C:
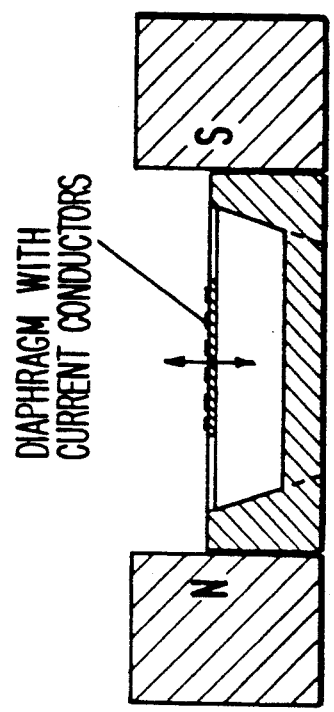
FIG. 2 is a schematic cross-sectional illustration of alternative embodiments of the actuator according to the invention.
Figure 2D:
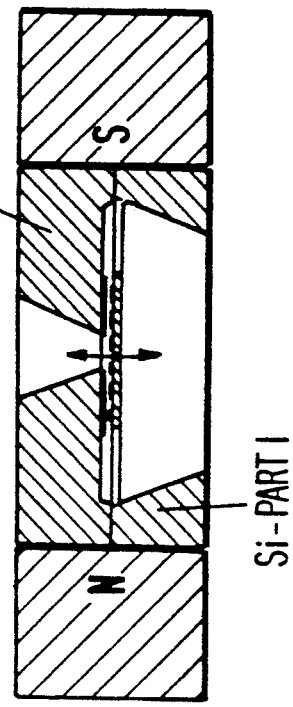
Figure 2A:
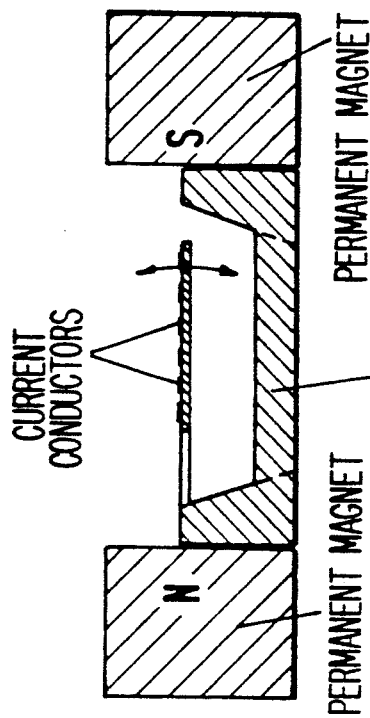

FIG. 2 shows the following types of actuators:

FIG. 2a is a view of a stationarily deflectable or continuously vibrating bending bar. Drive: Force 1. Possible use: Laser scanner. In this case, part of the bar surface must be metallized.

Figure 2B:
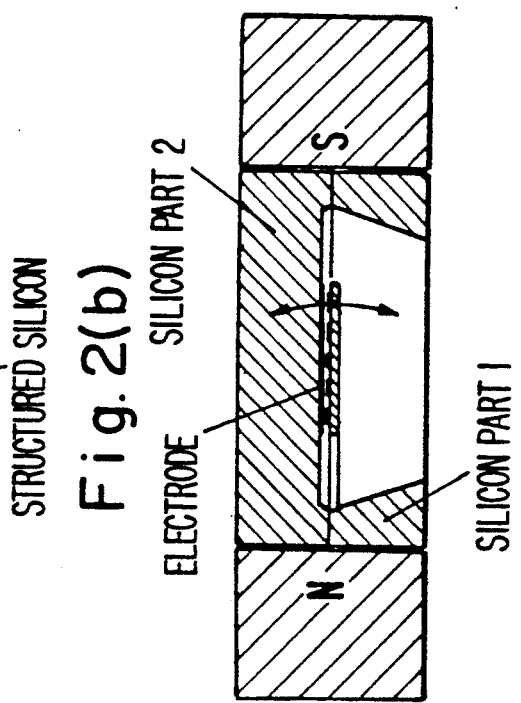

FIG. 2b is a view of an arrangement analogous to FIG. 2a, but with an additional electrode arranged on the rod surface. Drive: Forces 1 and 3. A plurality of current conductors is arranged on the bar surface which, in this case, is provided with an insulating layer, and is used as the counterelectrode for generating force 3. The above-mentioned electrode may, for example, be used for holding the bending bar in the deflected position so that two stationary conditions are possible.

FIG. 2c is a view of an arrangement analogous to FIG. 2a but with a diaphragm as the movable element. Drive: Force 1;

FIG. 2d is a view of an arrangement analogous to FIG. 2c but with an additional electrode with respect to the diaphragm surface. Drive: Forces 1 and 3. If a bore is provided (as shown) in the Si-part 2 carrying the electrode, this arrangement is particularly suitable for use as a valve.

Figure 3A:
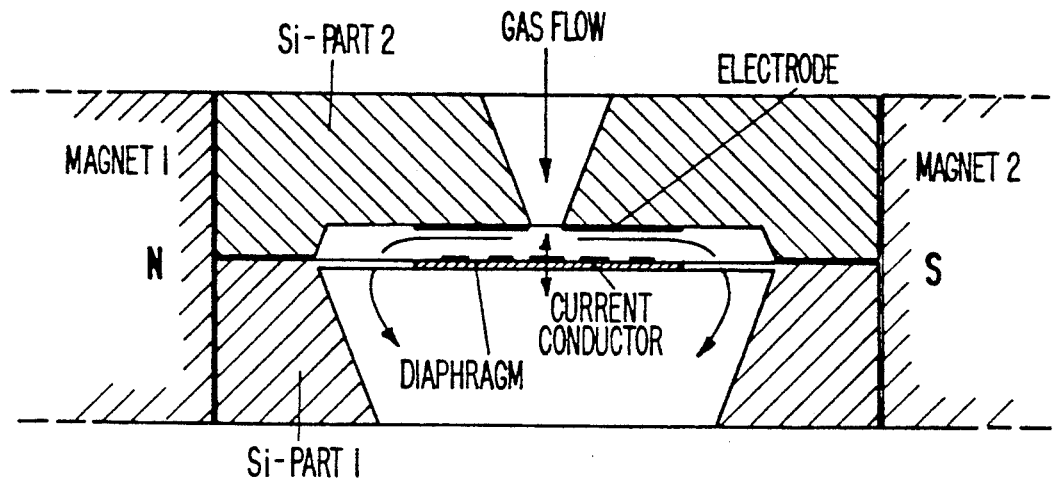
FIG. 3a is an enlarged view of the actuator mechanism of FIG. 2d.

The principal embodiments of the actuator as a microvalve are described in detail in the following:

FIG. 3a—Microvalve "currentless open"

The method of operation is as follows: The diaphragm, which is produced in the Si-part 1 by means of anisotropic etching, has a plurality of current conductors arranged on its surface, in which the current required for actuation of the valves flows (all in the same direction), perpendicularly with respect to the plane of projection. The magnetic field generated by the permanent magnets 1 and 2 has the direction "left-right" so that the force generated during the current conduction is directed "upward" or "downward". In this manner, the diaphragm can therefore be moved out of its rest position. In the currentless condition, as shown, the valve opening is free; during the current passage (in the correct direction), the diaphragm is deflected upward and seals off the valve opening. The condition "valve shut" can be maintained virtually without power by including the electrode mounted on Si-part 2 in the area of the sealing surface. By feeding a voltage between this electrode and the diaphragm current conductor structure, the required force of attraction (force 3) is generated. A variant of the valve control is obtained by the reversal of the flow direction outlined in FIG. 3a. In the "valve shut" condition, the diaphragm holding force can be applied by the system pressure of the controlling medium (servo-function). The elements for generating the electrostatic force component are superfluous in this case. The geometric configuration of the current conductor and electrode structure is shown in FIG. 4.

Figure 3B:
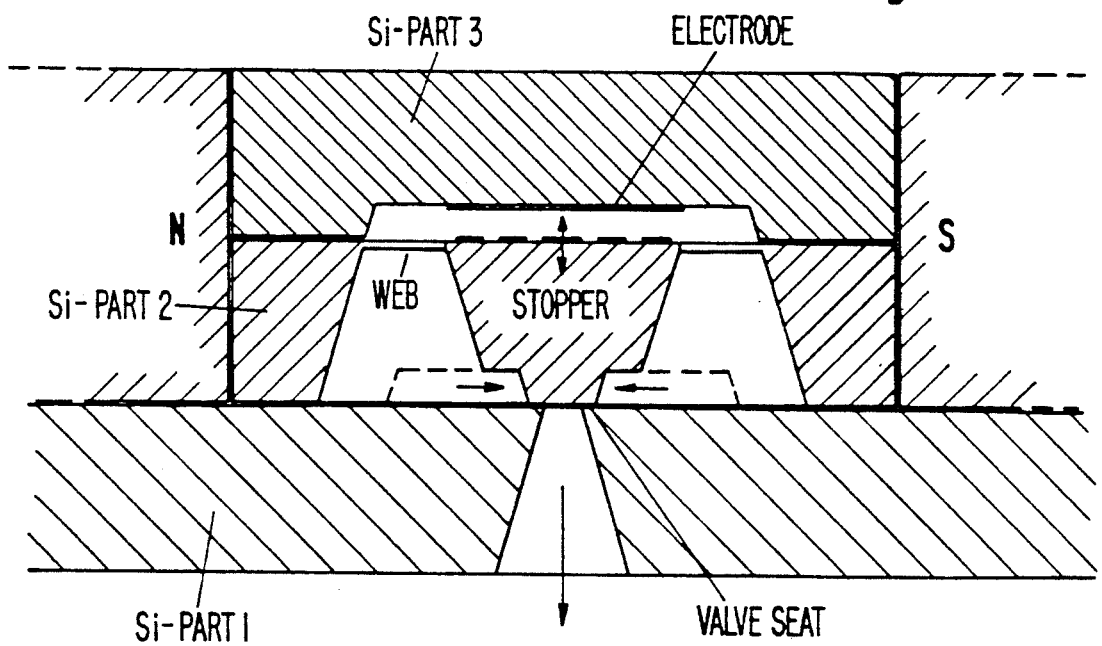

FIG. 3b—Microvalve "currentlessly shut"

The forces for the actuation of the valve are generated as mentioned above. The silicon parts which are joined together to form the valve are constructed such that, in the inoperative condition, the valve opening is closed. Instead of the movable diaphragm, the Si-part 1 carries a "stopper" which is suspended on thin webs. The flow direction of the medium to be controlled extends on the inlet side (in Si-part) perpendicularly with respect to the plane of projection.

Figure 4A:
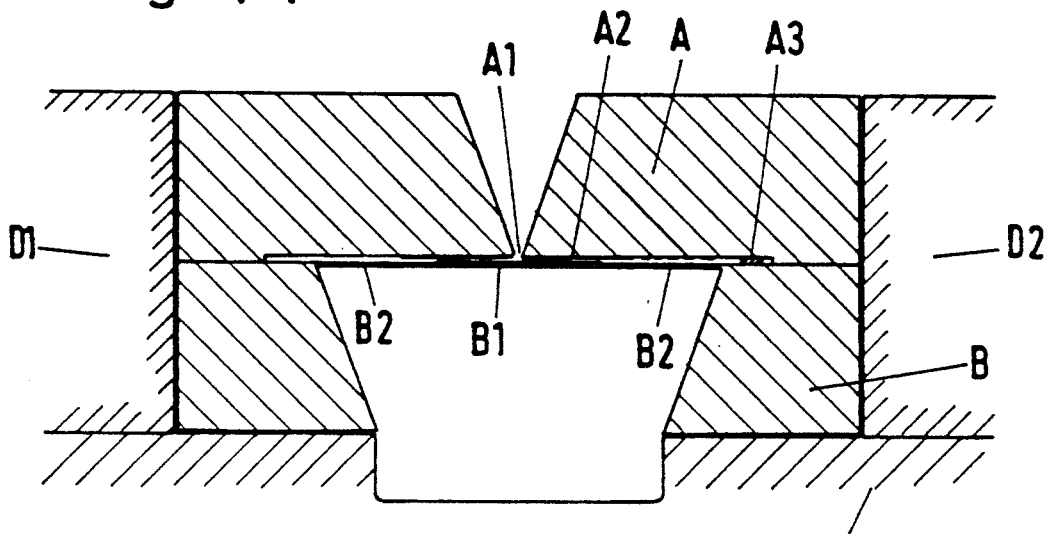
FIGS. 4(A) and (B) show the construction details of the actuator mechanism of FIG. 3a, viewed in cross-section and from the top.
Figure 4B:
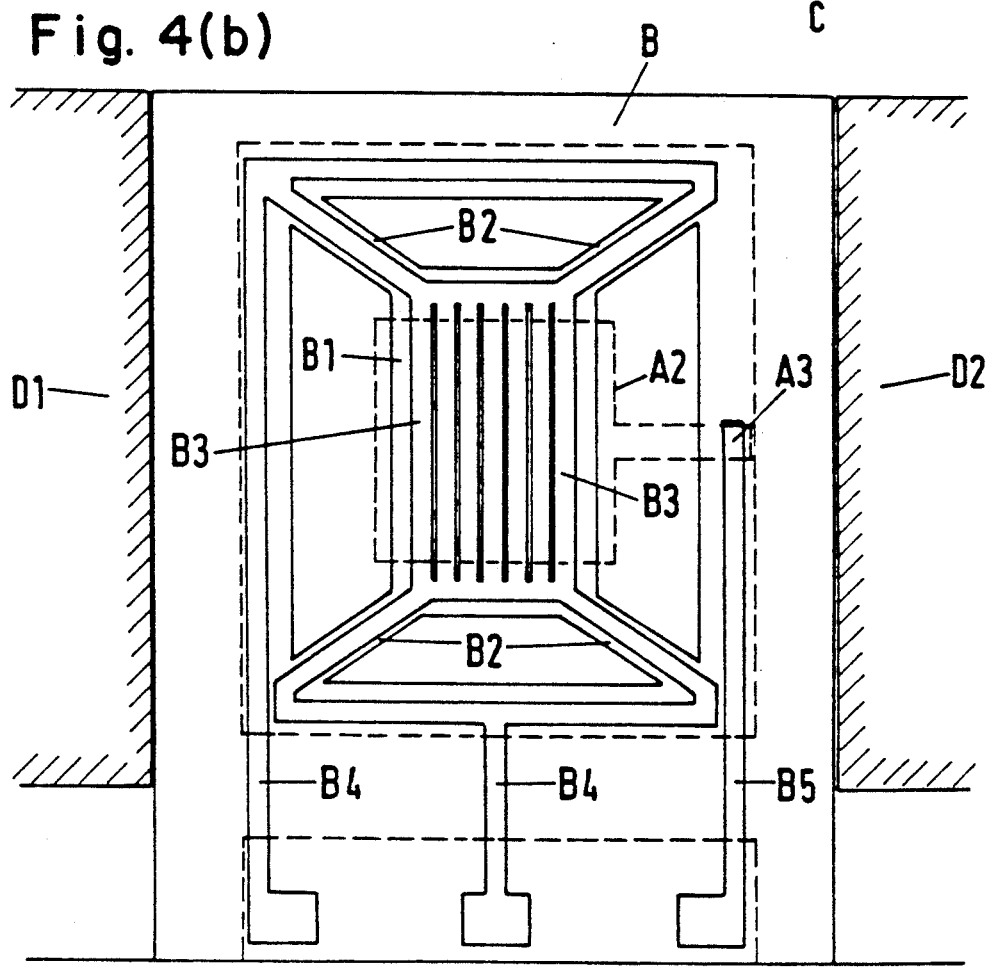

FIG. 4 shows the construction details of the valve according to FIG. 3a at the scale of 5.0:1. Top: cross-section; bottom: top view of Si-part 1.

Symbols:
A: silicon—part 2
A1: valve opening
A2: electrode
A3: contact A2 to B5
B: silicon—part 1
B1: diaphragm
B2: webs (diaphragm suspension)
B3: current conductor system on B1
B4: feed lines to B3
B5: feed line to electrode A2
C: carrier plate with flow duct (Si or glass)
D1: permanent magnet 1
D2: permanent magnet 2

The required current conductors, electrode surfaces and contact surfaces are preferably produced by vaporplating with gold (thickness 0.5–1 $\mu$m) and by means of the structuring methods used in semiconductor technology. Selectively, the electrode A2 and/or the conductor arrangement B3 are provided with an insulating protective layer (for example, 1 $\mu$m Si-oxide). In principle, the current conductor B3 may consist of a single conductive surface, the thickness of which is determined by the maximally required current. However, in this case, the current distribution would not be optimal with respect to the generating of force. The division into several parallel tracks has the goal of permitting only those current components which contribute to the Lorentz force. Current is supplied by the webs B2 (half the total current for each web) and the conductor tracks (with contact pads) B4. The feed line B5 to electrode A2 is guided by way of the contact point A3 between Si-part 1 and Si-part 2 in order to have all electric connections on a single bonding plane.

Figure 5A:
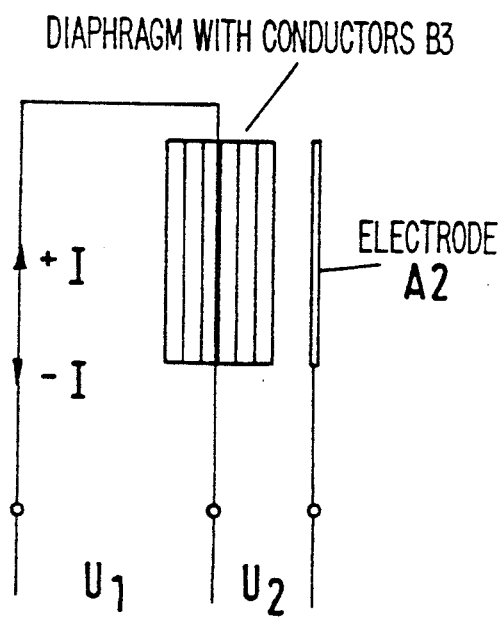
FIGS. 5(A) and (B) illustrates the manner in which the actuator according to the invention is controlled by electrical pulses and voltages.
Figure 5B:
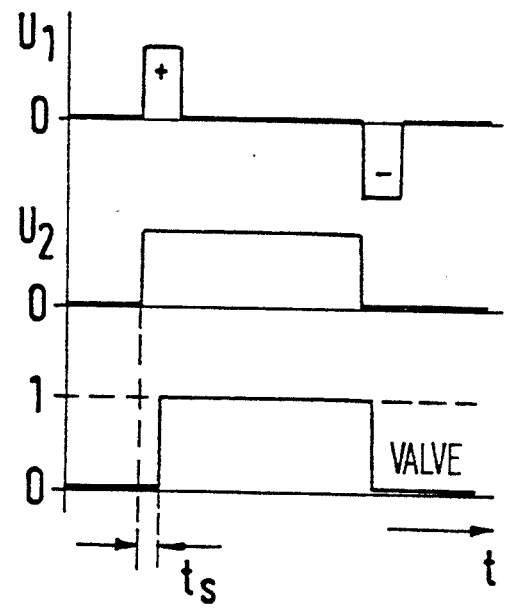

FIG. 5—Electric Control of the Microvalve

It is assumed that the valve operation is digital. The generation of the "open" and "shut" conditions takes place by the control by means of the two voltages U1 and U2. Starting from the (currentless) open condition, the valve is shut by a voltage pulse +U1. The simultaneously fed voltage U2, on the one hand, increases the closing force and the closing speed and, on the other hand, maintains the closed, without a flow of current condition. The disconnecting of U2 opens the valve. This operation may again be assisted by a voltage pulse −U1.

Figure 6:
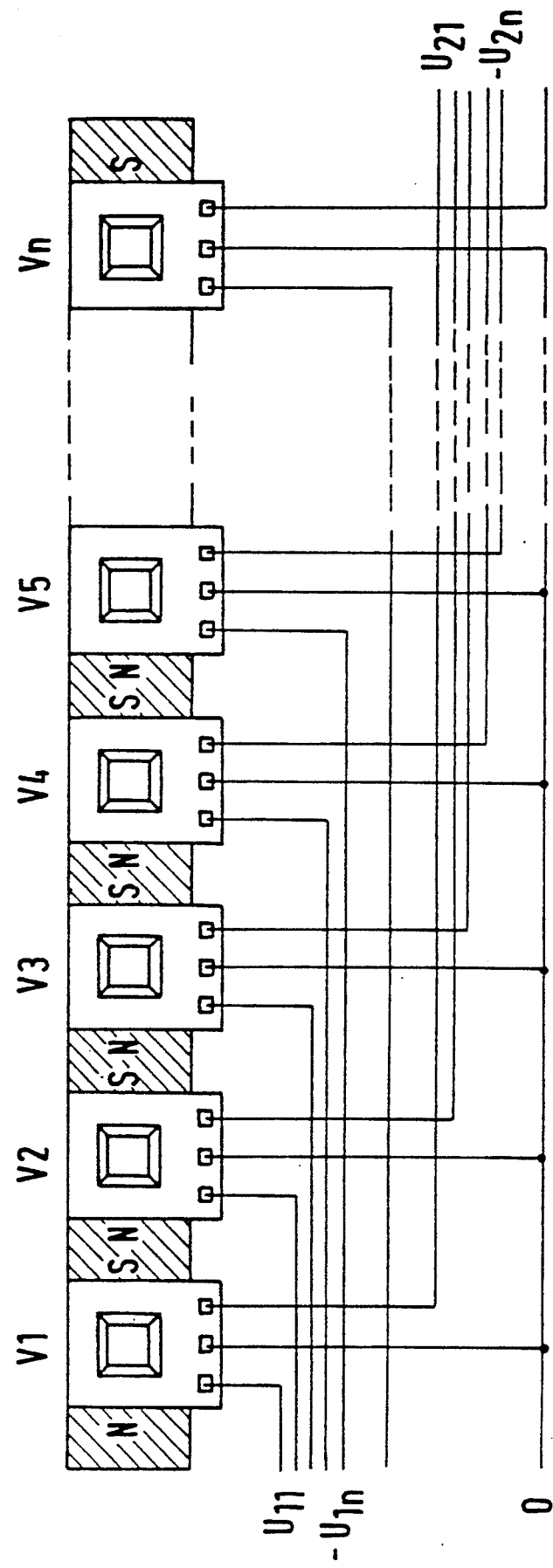
FIG. 6 is a schematic illustration of an array of several valves mounted on a carrier and actuated in accordance with the invention to provide a digitally controlled fluid flow.

FIG. 6—Schematic Representation of a Valve Array V1 . . . Vn

By means of the parallel arrangement of several valves on a carrier (which, among other things, contains the feeding and discharge lines), an approximately analog flow control can be achieved by means of the described digital valves. For this purpose the nominal flow quantities of the individual valves should expediently be ordered in binary gradations, so as to provide a pneumatic and hydraulic digital-analog converter.

Figure 7A:
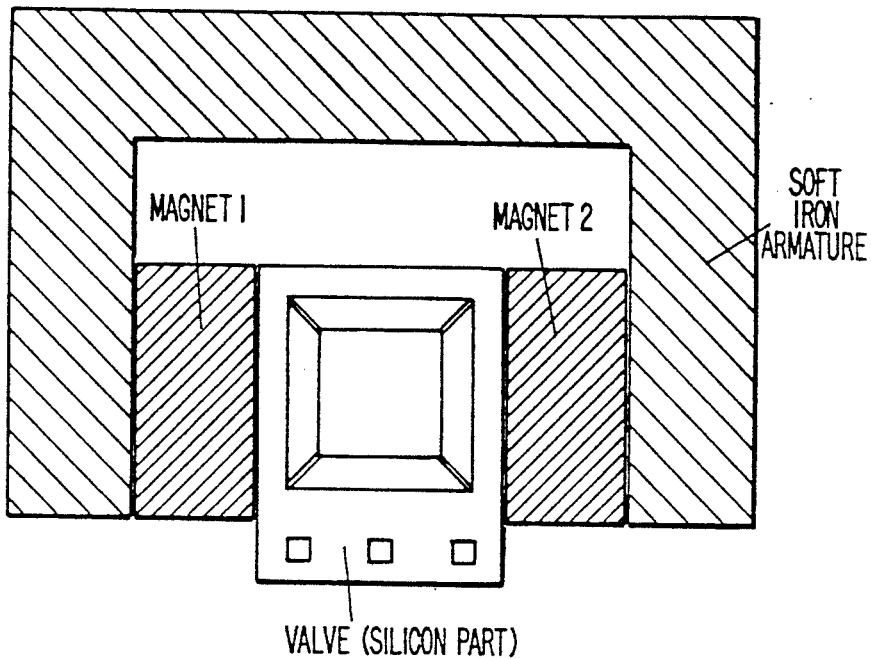
FIG. 7 illustrates two further alternative embodiments of an actuator according to the invention.

FIG. 7 illustrates two additional embodiments of the actuator according to the invention which relate to specific applications:

FIG. 7a—Construction for Particularly High Switching Forces

By adding a soft-iron armature which should have approximately the cross-section of the permanent magnets, the otherwise high stray flux of magnets 1 and 2 in the exterior space of the actuator is reduced drastically, which increases correspondingly the useful flux in the air gap in which the actuator part to be moved is situated. The force that can be generated rises proportionally to this increase of flux or field.

Figure 7B:
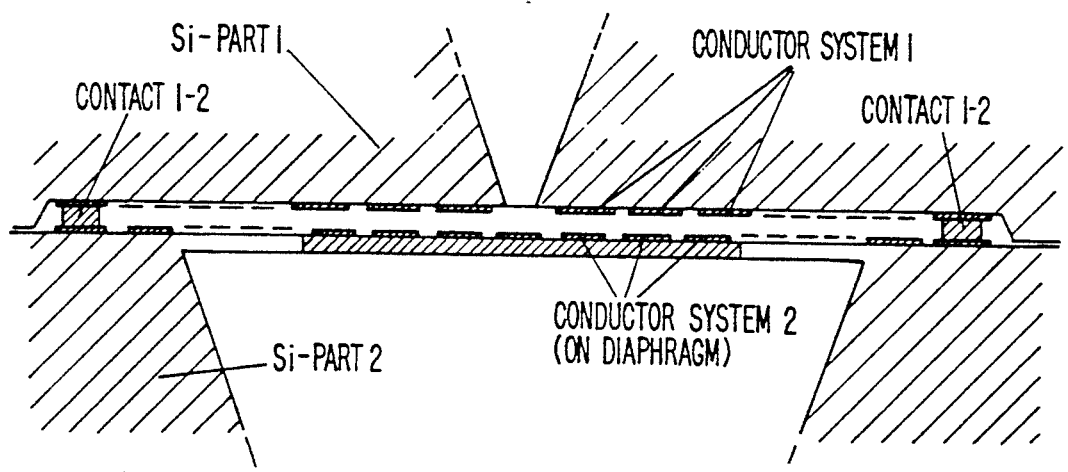

FIG. 7b—Construction for Low Switching Forces

Instead of the previously used two permanent magnets, a second current conductor system is integrated for generating a motive force ("force 2", see FIG. 1b). This conductor system is situated, for example, at the point of electrode A2 in FIG. 4. The paths of the currents of the two cooperating conductor systems should preferably be in parallel. The schematically outlined "contacts 1-2" have the purpose of guiding the connections of the upper conductor system, together with those of the lower conductor system, onto a plane. Compared with the permanent-magnet embodiment in FIG. 4, the forces that can be generated here are smaller by 1 to 2 orders of magnitude. This disadvantage is offset, however, by the advantage that the actuator volume which is reduced by the factor 2 to 3 so that, for example, actuator systems consisting of many individual components may have a more compact construction.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. In a micromechanical actuator, apparatus comprising:
a stationary part;
a movable part having a relatively small thickness in relation to a longitudinal dimension and surface dimensions thereof;
said movable part having at least a rest position and a deflected position;
an electrostatic field generator;
means for generating a magnetic field having substantially parallel lines of magnetic flux;
said movable part having fixed on a surface thereof at least one substantially linear electric conductor disposed in said magnetic field and oriented across said parallel lines of flux, whereby an electric current flowing in said at least one conductor in a first direction causes said movable part to move from said rest position to said deflected position, and an electric current flowing in said at least one conductor in a second direction causes said movable part to move from said deflected position to said rest position;
means for holding said movable part in one or more positions in a controlled manner in response to forces generated by said electrostatic field; and
means for controlling response of said movable part to said magnetic field and said electric field.

2. A micromechanical actuator according to claim 1, wherein said stationary and movable parts, said magnetic field generator, said electric field generator and said control means are constructed on a substrate in the form of an integrated component.

3. In a micromechanical actuator, apparatus comprising:
a stationary part;
a movable part having a thickness which is relatively small in comparison to a longitudinal dimension and a surface area thereof;
said movable part being adapted to be displaced between, and held in, different positions relative to said stationary part in response to electrical forces exerted thereon;
said movable part having at least a rest position and a deflected position;
means for generating a magnetic field having substantially parallel lines of magnetic flux;
said movable part having fixed on a surface thereof at least one substantially linear electric conductor disposed in said magnetic field and oriented across said parallel lines of flux, whereby an electric current flowing in said at least one conductor in a first direction causes said movable part to move from said rest position to said deflected position, and an electric current flowing in said at least one conductor in a second direction causes said movable part to move from said deflected position to said rest position; and
means for holding said movable part in said deflected position in a controlled manner in response to electrostatic forces.

4. A micromechanical actuator according to claim 3, wherein said stationary part and said movable part are constructed on a substrate in the form of an integrated component.

5. A micromechanical actuator according to claim 4, wherein several of said integrated components are connected to form a surface-type rectilinear array of lines and columns, the connection of said integrated components being in one of series or parallel configuration.

6. A micromechanical actuator according to claim 2, wherein several of said integrated components are connected to form a surface-type rectilinear array of lines and columns, the connection of said integrated components being in one of series or parallel configuration.

7. In a micromechanical actuator, apparatus comprising: a stationary part;

a movable part having a thickness which is relatively small in comparison to a longitudinal dimension and a surface area thereof;

said movable part being adapted to be displaced between, and held in, different positions relative to said stationary part in response to fluidic forces exerted thereon;

said movable part having at least a rest position and a deflected position;

means for generating a magnetic field having substantially parallel lines of magnetic flux;

said movable part having fixed on a surface thereof at least one substantially linear electric conductor disposed in said magnetic field and oriented cross said parallel lines of flux, whereby an electric current flowing in said at least one conductor in a first direction causes said movable part to move from said rest position to said deflected position, and an electric current flowing in said at least one conductor in a second direction causes said movable part to move from said deflected position to said rest position; and means for holding said movable part in said deflected position in a controlled manner in response to electrostatic forces.

* * * * *